United States Patent
Nakamura et al.

(10) Patent No.: US 7,283,034 B2
(45) Date of Patent: Oct. 16, 2007

(54) OBJECT SENSOR AND CONTROLLER

(75) Inventors: Akihiko Nakamura, Muko (JP);
Tetsuo Nishidai, Kyotanabe (JP);
Yasuhiro Sato, Otsu (JP); Tadao Nishiguchi, Kyoto (JP); Naoyuki Ishihara, Kyoto (JP)

(73) Assignee: OMRON Corporation, Kyoto (JP)

( * ) Notice: Subject to any disclaimer, the term of this patent is extended or adjusted under 35 U.S.C. 154(b) by 281 days.

(21) Appl. No.: 10/498,381

(22) PCT Filed: Dec. 6, 2002

(86) PCT No.: PCT/JP02/12812

§ 371 (c)(1),
(2), (4) Date: Sep. 28, 2004

(87) PCT Pub. No.: WO03/050370

PCT Pub. Date: Jun. 19, 2003

(65) Prior Publication Data

US 2005/0083174 A1    Apr. 21, 2005

(30) Foreign Application Priority Data

Dec. 10, 2001  (JP)  .............................. 2001-375668
Dec. 2, 2002   (JP)  .............................. 2002-349415

(51) Int. Cl.
  *B60R 25/00*  (2006.01)
  *G05B 19/00*  (2006.01)
  *G06F 7/00*   (2006.01)
  *G06B 29/00*  (2006.01)
  *H04B 1/00*   (2006.01)

(52) U.S. Cl. ..................... 340/5.72; 340/5.61; 340/5.2; 340/5.8

(58) Field of Classification Search ............... 340/5.72, 340/5.61–5.64, 5.2, 5.8, 10.1–10.3, 426.13, 340/426.24, 426.25, 442; 346/425.5, 567; 342/28, 27

See application file for complete search history.

(56) References Cited

U.S. PATENT DOCUMENTS 5,682,135 A * 10/1997 Labonde ................. 340/26.17

(Continued)

FOREIGN PATENT DOCUMENTS

DE    195 18 396-A 1    11/1996

(Continued)

OTHER PUBLICATIONS

Supplementary European Search Reported dated Feb. 15, 2006 (5 pages).

(Continued)

Primary Examiner—Brian Zimmerman
Assistant Examiner—Nam Nguyen
(74) Attorney, Agent, or Firm—Osha Liang LLP

(57) ABSTRACT

A sensor for detecting a specific object (such as a hand) excellent in operation reliability and response, further excellent in mountability (dominance such as in size and design) on a vehicle, and much less in power consumption than conventional impulse radars. The object sensor comprises detecting wave transmitting means and reflected wave receiving means of an impulse radar and a judging circuit part (40) for turning on the detection output when the amplitude level of a signal component, in a frequency range corresponding to the moving speed range of a specific object, of a signal received by the reflected wave receiving means lies in a predetermined range corresponding to the reflection characteristics of the specific object.

24 Claims, 11 Drawing Sheets

U.S. PATENT DOCUMENTS

| | | | |
|---|---|---|---|
| 5,682,164 A | 10/1997 | McEwan | |
| 5,760,687 A | 6/1998 | Cousy | 340/554 |
| 6,072,427 A | 6/2000 | McEwan | |
| 6,426,716 B1* | 7/2002 | McEwan | 342/28 |
| 6,431,643 B2* | 8/2002 | Grey | 296/214 |
| 6,552,649 B1* | 4/2003 | Okada et al. | 340/5.61 |
| 6,577,226 B1* | 6/2003 | Steiner | 340/5.62 |
| 6,597,284 B2* | 7/2003 | Juzswik | 340/442 |
| 6,825,752 B2* | 11/2004 | Nahata et al. | 340/5.64 |

FOREIGN PATENT DOCUMENTS

| | | |
|---|---|---|
| DE | 100 07 500-A 1 | 9/2001 |
| EP | 0 735 219 A2 | 10/1996 |
| FR | 2 683 334 A | 5/1993 |
| FR | 2 749 607-A 1 | 12/1997 |
| GB | 1 530 171 A | 10/1978 |
| JP | 4-186186 | 7/1992 |
| JP | 7-128445 | 5/1995 |
| JP | 9-60368 | 3/1997 |
| JP | 9-284409 | 10/1997 |
| JP | 11-182109 | 7/1999 |
| JP | 2000-132722 | 5/2000 |
| JP | 2001-212032 | 8/2001 |
| JP | 2001-238922 | 9/2001 |
| WO | WO99/52722 A | 10/1999 |

OTHER PUBLICATIONS

Supplementary Partial European Search Report dated Nov. 10, 2005, 5 pages.

* cited by examiner

Fig. 2
(a)
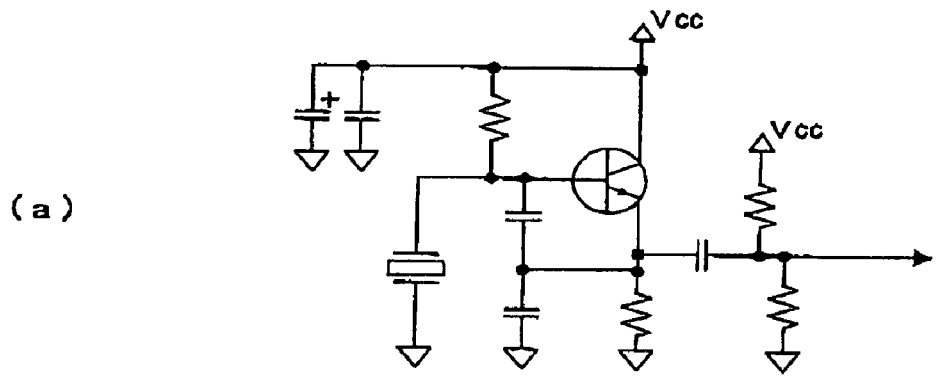
(b)
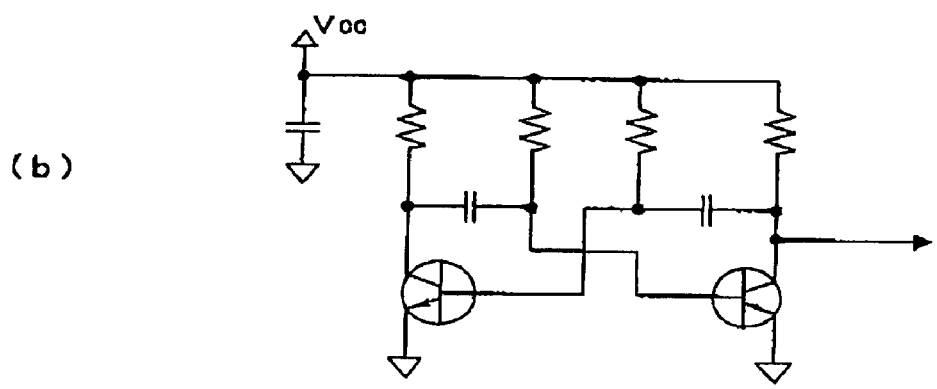
(c)
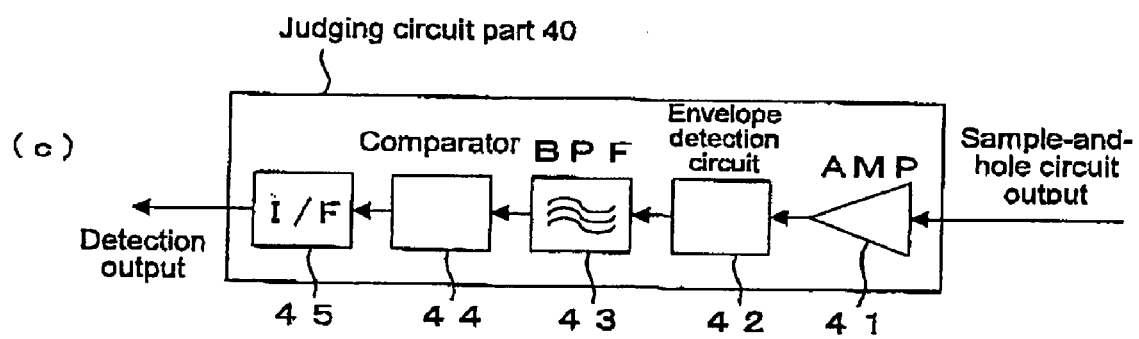

Fig. 3
(a) 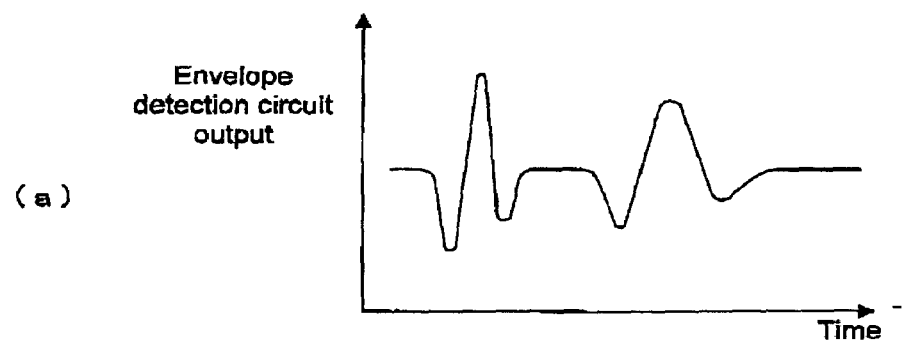
(b) 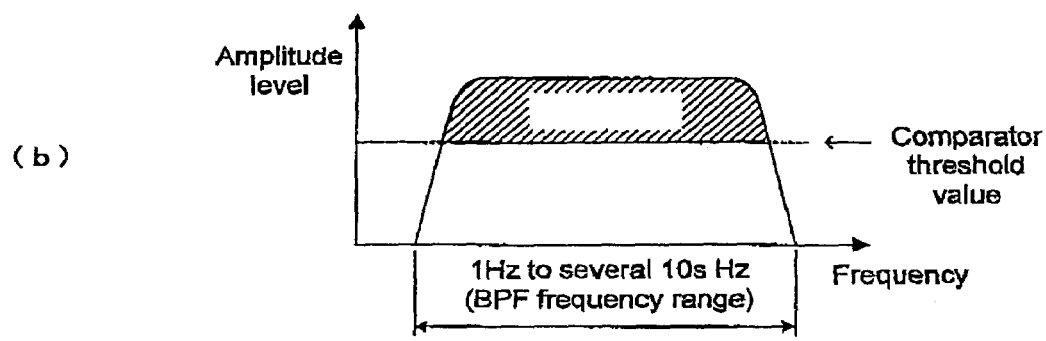
(c) 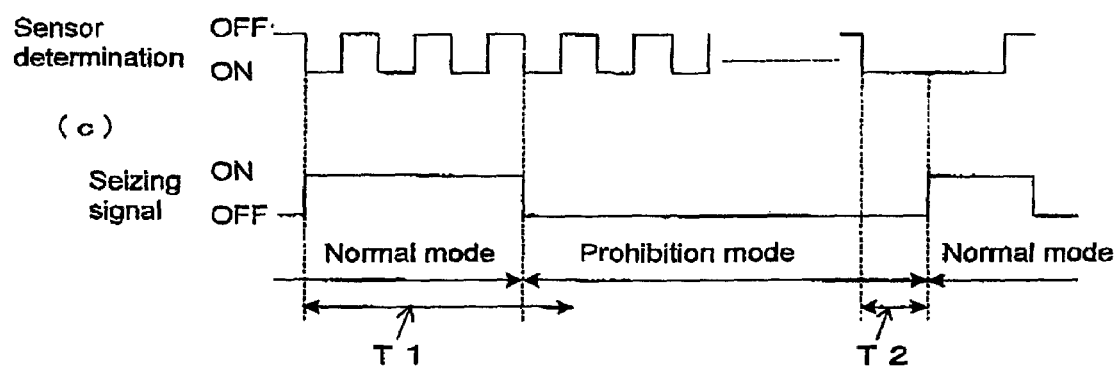

Fig. 6
(a)
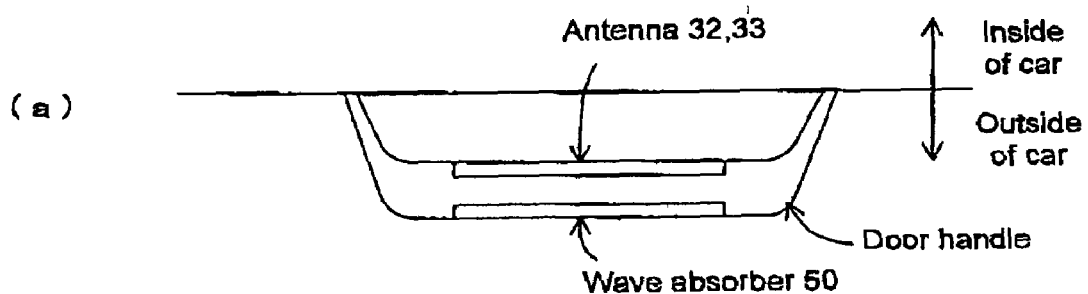
(b)
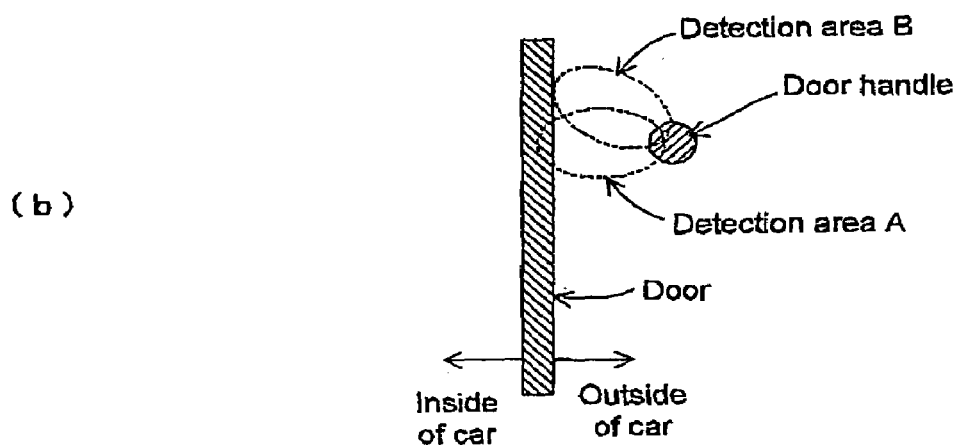
(c)
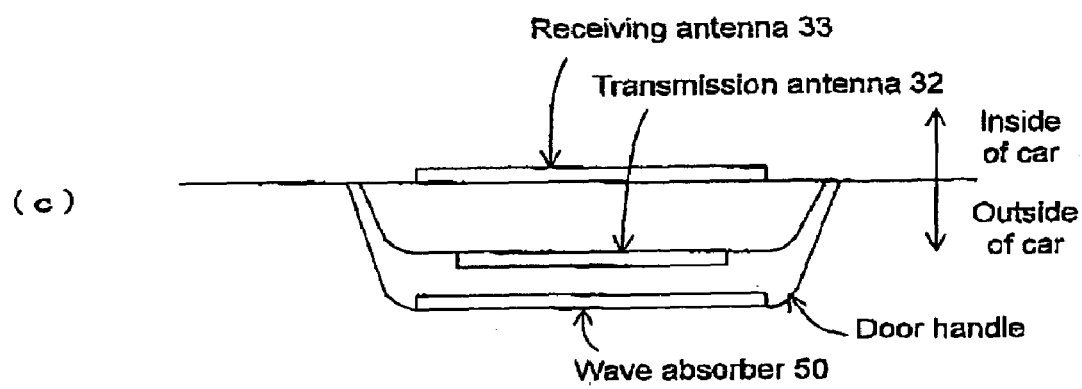

Fig. 7
(a)
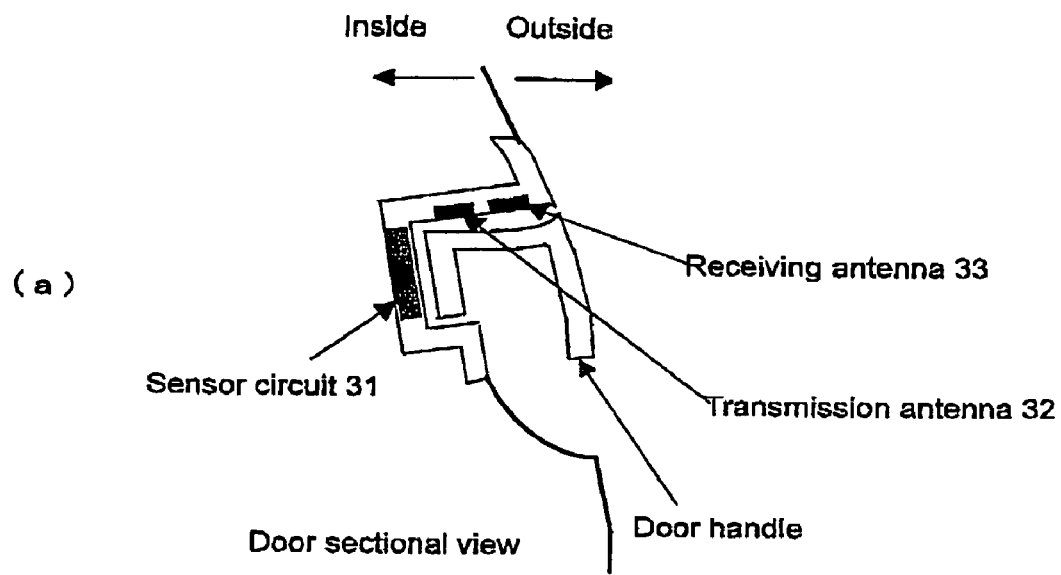
(b)
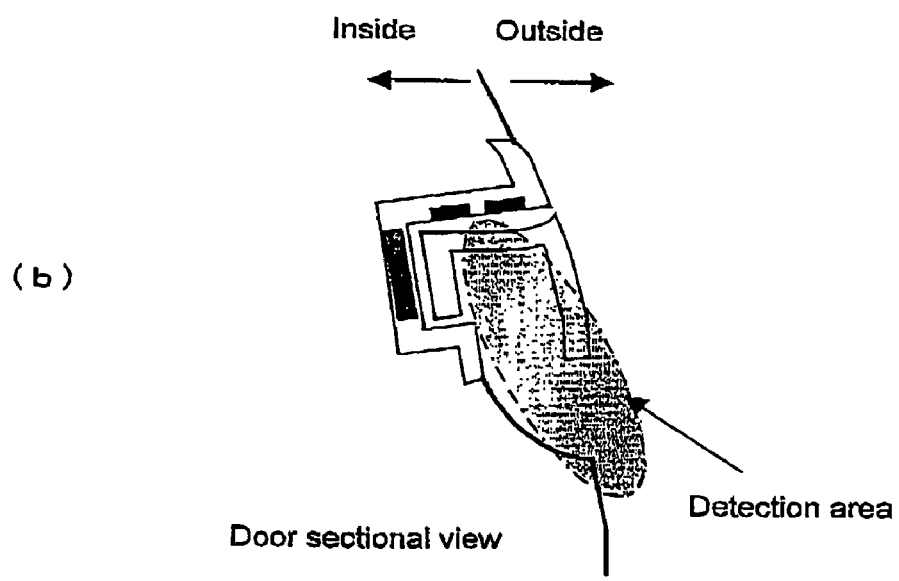

Fig. 8
(a) 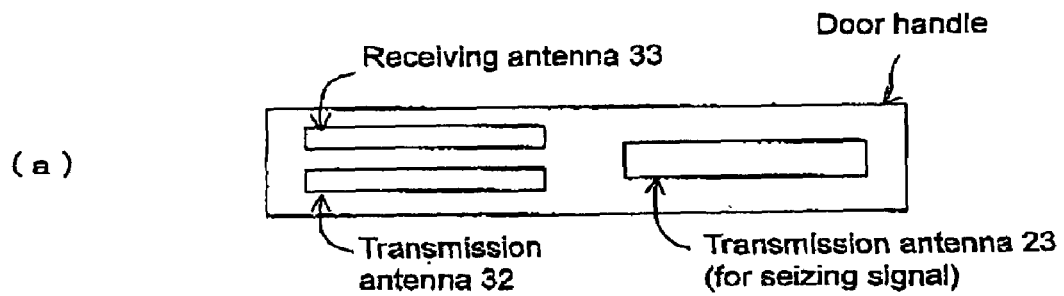
(b) 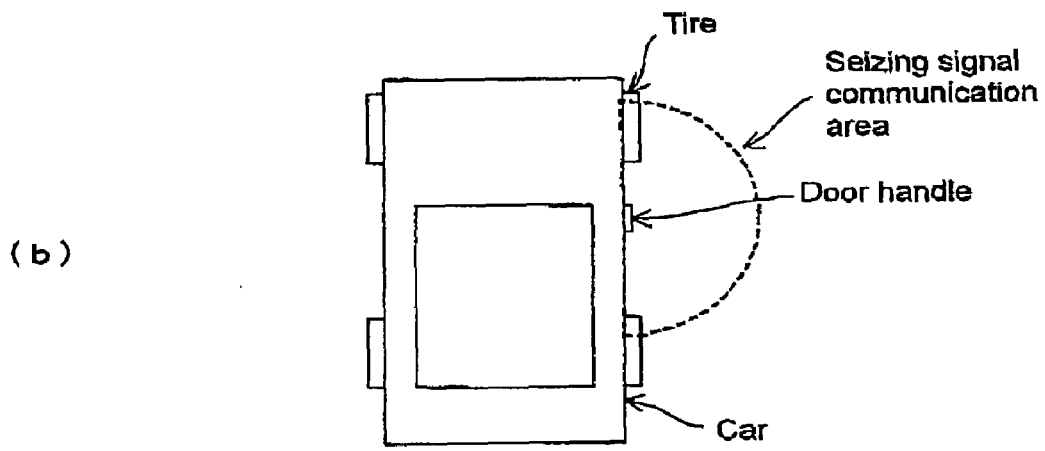
(c) 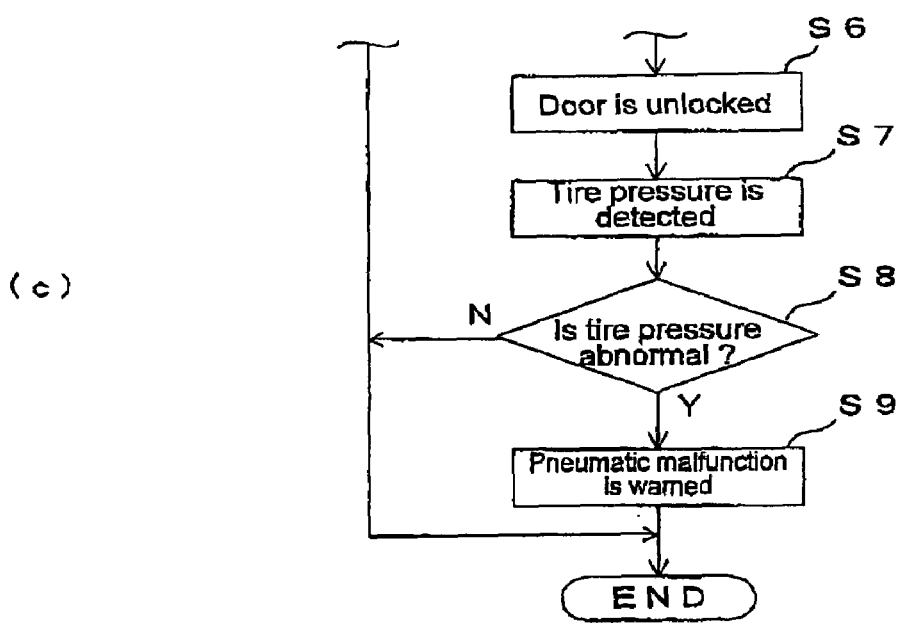

Fig. 10
(a)
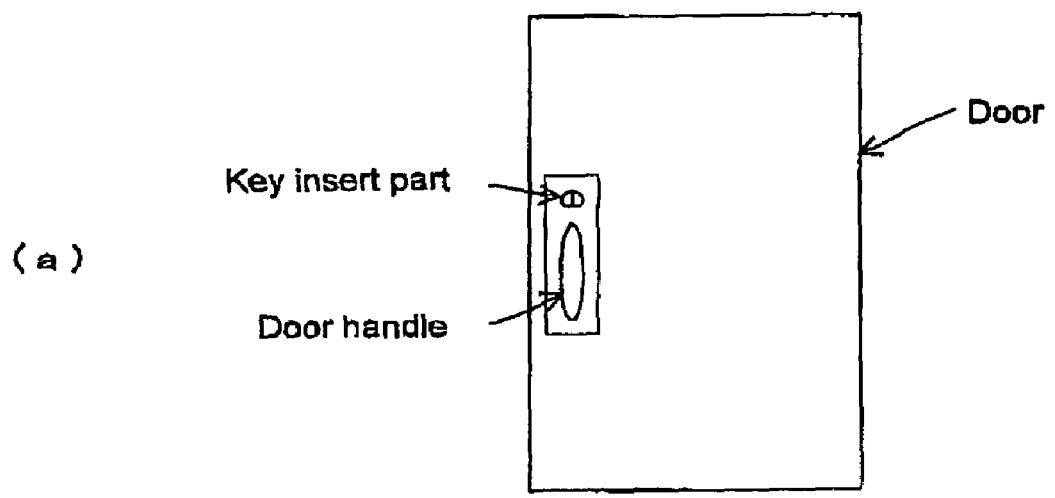
(b)
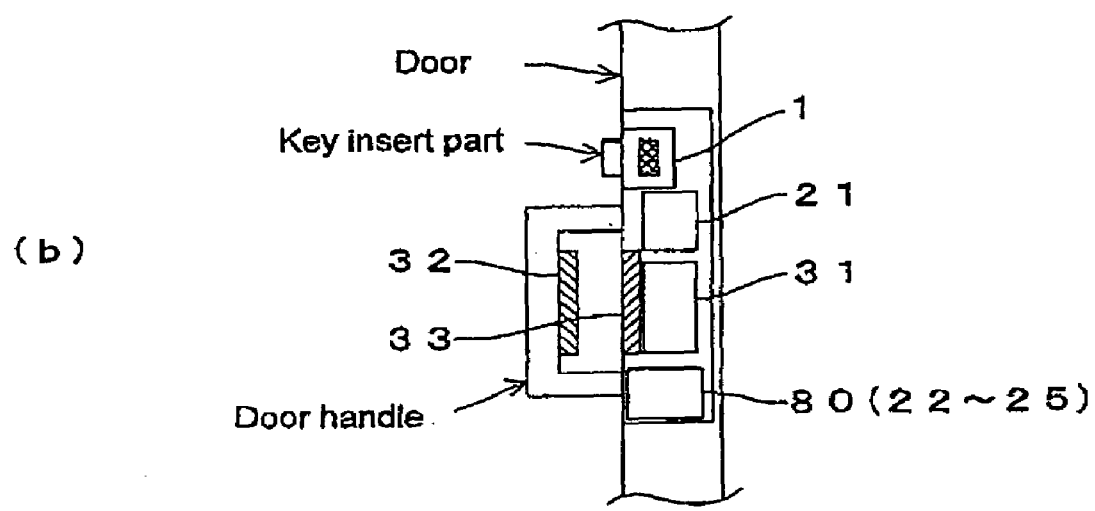

Fig. 11
(a)
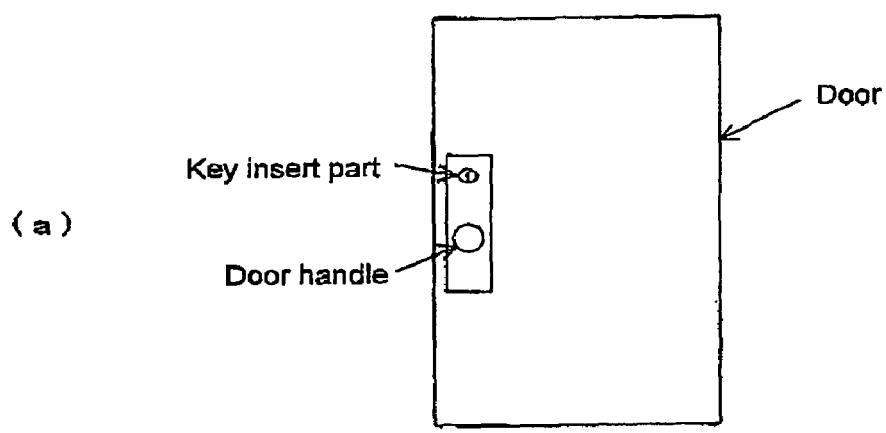
(b)
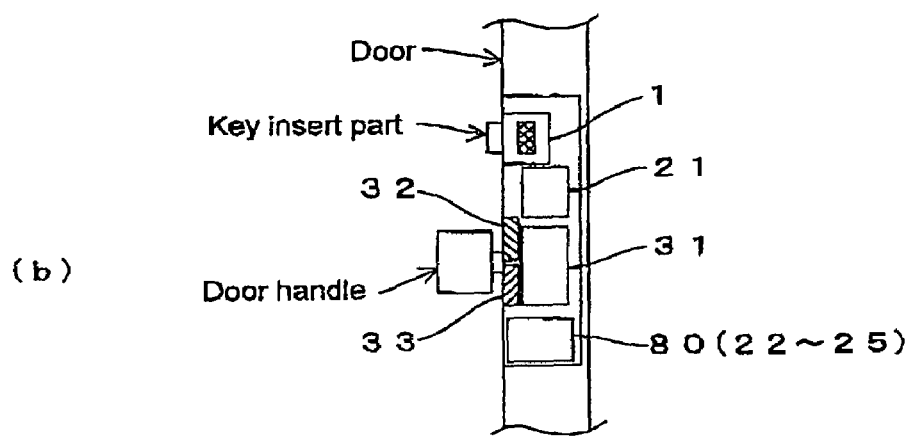
(c)
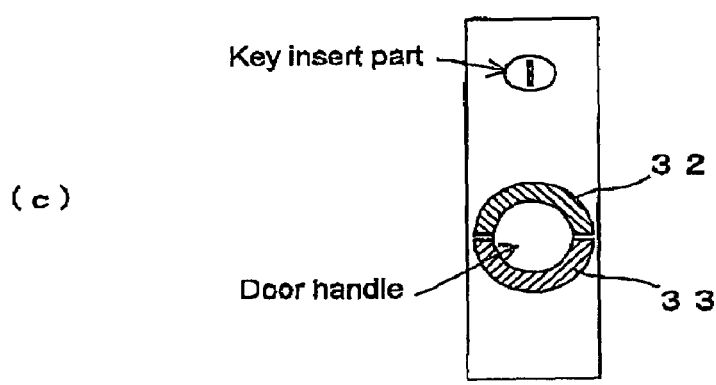

OBJECT SENSOR AND CONTROLLER

TECHNICAL FIELD

The present invention relates to an object sensor which is suitable for being used when a hand of a user of a vehicle approaching a door handle is detected in order to trigger an automatic unlocking operation of a passive entry system of the vehicle, for example, and a controller using the above sensor.

BACKGROUND ART

Recently, according to an entry system of a vehicle, there has been proposed a device provided in a vehicle which performs an automatic operation by establishing bidirectional communication between a portable machine carried by a vehicle user and a body machine mounted on the vehicle, and then confirming necessary cross-check, which is partially put to practical use.

According to the bidirectional communications since an answer signal including a necessary code is automatically transmitted from the portable machine to the body machine in response to a request signal (a seizing signal activating the portable machine, for example) transmitted from the body machine, a predetermined operation on the vehicle can be performed without any manipulation by the user. For example, according to the entry system of the vehicle, the bidirectional communication is established only when the user having the portable machine comes close to a door of the specific vehicle mounting the corresponding body machine, an unlocking command is automatically output to a locking device of the door in a locked state, and the vehicle door can be automatically unlocked. In addition, such more convenient entry system in which the unlocking or the locking operation of the vehicle door is implemented without requiring intentional manipulation of the user basically is called a passive entry system (or a smart entry system) or the like as a developed type of a general keyless entry, which is needed in market as the one enhancing a product value of the vehicle.

Meanwhile, when this passive entry system transmits a request signal from the body machine only when it is required in order to save a battery power of the vehicle, it is necessary to provide a detection device which detects that the vehicle user approaches or touches the vehicle (a door handle part, for example).

However, as such detection device, an optical or an electrostatic capacity type of sensor or a mechanical switch (so-called microswitch and the like) has been used conventionally. This optical sensor detects that the hand of the vehicle user approaches the door handle, for example, based on an output change of a light-emitting element caused when a light output from the light-emitting element is interrupted by the hand, or an output change of the light-emitting element caused when the light reflected by the hand of the vehicle user is input to the light-receiving element. Meanwhile, the electrostatic capacity type of sensor is a so-called touch sensor which detects the hand when the vehicle user touches the door handle, for example, based on a change in capacity in the sensor because of the touch of the hand, as disclosed in Japanese Unexamined Patent Publication No. 2002-295064.

In addition, as a noncontact type of close-range sensor, as disclosed in International Publication Wo 00/023762, an impulse radar which is used in landmine detection is known.

However, the above-described detection device has the following problems.

(a) In the case of the optical sensor, malfunction could occur because of a stain or a foreign object (rain or a dead leaf, for example).

(b) Since a detection area is small (a detection distance is short), it is difficult to obtain sufficient response so that a problem could occur in the operation of the applied system. For example, in a case the sensor is provided at a handle of a vehicle door in order to trigger request signal transmission in the passive entry system of the vehicle, since the hand of the user is not detected until it approaches and almost touches the sensor (that is, the request signal is not output yet), even when the user pulls up the door handle to open the door, the door is not opened because the automatic unlocking operation is not implemented yet (that is, even when the user tries to open the door in the locked state using the passive entry system, the user cannot open the door because the automatic unlocking operation is not implemented yet and the user feels stuck on the handle) in some cases. Especially, in the case of the electrostatic capacity type of sensor or the mechanical type of switch, the hand of the user is not detected until the hand completely touches the sensor. Thus, in the constitution in which at least the sensor is simply attached to the door handle, since the communication with the portable machine is established after the user starts to pull the door handle to open the door and then the automatic unlocking operation is performed the above problem surely occurs.

(c) Since it is necessary to provide a sensor element which is relatively large and hard to be incorporated, at a place (the door handle of the vehicle, for example) in which the approaching object is to be detected, it is necessary to considerably change a configuration or a size of the place in which the approaching object is to be detected. As a result, the degree of freedom in design at the place is largely limited. Especially, when the hand of the user approaching the door handle of the vehicle is to be detected by the optical sensor or the mechanical type of switch with high response as much as possible, it is necessary to arrange a light-emitting element or a light-receiving element in the vicinity of the door handle or to arrange a contact of the mechanical type of switch at a place projecting from the. door handle, which considerably affects a deign of the door handle or the car body in the vicinity of it.

In addition, as the noncontact type of close-range sensor in which a detection area can be largely set and there is no influence of stains and the like, as described above, the impulse radar which is used in the landmine detector is known. The inventors thought about applying the impulse radar to the above-described sensor. However, since the conventional impulse radar performs complicated judging processes (many waveforms of the reflection waves are sampled, compared and analyzed to determine the existence of the specific object) using a microcomputer, its power consumption is high. Consequently, it was found that it could not be applied to the object sensor of the vehicle using a battery as a power supply. Especially, in the case of the detection device in the above passive entry system of the vehicle, it is necessary to repeatedly and continuously (periodically, for example) carry out a detecting operation in which a detection wave of the radar is output and its reflection wave is received even while the vehicle is stopped so that the hand can be detected whenever it approaches the door handle. Consequently, the power consumption for the detecting operation has to be lowered as much as possible, otherwise the battery of the vehicle runs out soon, that is, the power has to be saved several orders of magnitude more than the landmine detector. As a result, the conventional impulse radar cannot be applied as it is.

It is an object of the present invention to solve the above problems and to provide an object sensor excellent in operation reliability and response, further excellent in mountability (dominance such as in size and design) on a vehicle, and much less in power consumption than conventional impulse radar, using technique of the impulse radar, and a controller using the above sensor.

DISCLOSURE OF INVENTION

An object sensor according to the present invention detects that a specific object approaches in a specific speed range and comprises detecting wave transmitting means and reflected wave receiving means of an impulse radar, and a judging circuit part for turning on a detection output when an amplitude level of a signal component in a frequency range corresponding to the speed range is in a predetermined range corresponding to properties of the specific object, among signals received by the reflected wave receiving means.

Here, the "specific object" is someone's hand, for example. In addition, the "specific speed range" is a speed range in which someone's hand is moved normally, for example. In addition, the "properties of the specific object" are properties affecting reflection characteristics of an electric wave, that is, mainly permittivity.

In addition, the "judging circuit part" comprises a filter for only outputting the signal component in the frequency range, among the signals received by the reflected wave receiving means, and a comparator for comparing the amplitude level of the output of the filter with a threshold value corresponding to a boundary of the predetermined range and turning on the detection output when the amplitude level is in the predetermined rage, for example. As a result, it can be simplified and miniaturized.

According to this object sensor, the following effects can be provided.

(1) Since the approaching specific object to be detected is detected using the impulse radar in a contactless manner, error detection caused by a stain does not occur and possibility the error detection caused by a foreign object (rain or a dead leaf, for example) occurs is considerably lower than in a case of the conventional optical sensor and the like. Especially, according to this sensor, since the specific object is discriminated from others, based on both receive intensity (amplitude level) and the frequency of the reflection wave, the possibility the foreign object is erroneously detected is extremely low.

(2) Since a detection area can be appropriately set large enough by setting a transmission output or reception sensibility of the impulse radar, enough response can be provided.

(3) Since the impulse radar is used, it is not always necessary to provide the whole components (the judging circuit part and the like) of the object sensor at a predetermined position (the door handle of the vehicle, for example) in which the object approaching is detected. That is, at least the antennas-of the impulse radar may be set at the predetermined position or in the vicinity thereof. In addition, according to this sensor, since the detection is judged by the frequency and the amplitude level of the reflection wave signal and the microcomputer is not used in the judging process, the constitution of the judging circuit part is simplified and miniaturized, so that the whole of the object sensor including the judging circuit part can be relatively easily incorporated in the door handle. Therefore, it is less necessary to change the configuration or the size of the predetermined position (or in the vicinity thereof), and a degree of freedom in its design is not strictly limited.

(4) According to the object sensor, the microcomputer is not used in the judging process. Therefore, the power consumption can be considerably lowered as compared with the conventional impulse radar which performs complicated judging processes by a microcomputer. As a result, the sensor can be mounted on the vehicle as a trigger of the passive entry system without any problem (the problem such that the battery of the vehicle could run out is solved).

In addition, a transmission clock generating circuit (a circuit for generating a so-called reference wave) necessary for an element of the detecting wave transmitting means and a receiving clock generating circuit (a circuit for generating a so-called beat wave) necessary for an element of the reflected wave receiving means are preferably constituted by separate oscillation circuits. In this case, the power consumption can be further lowered, as compared with the conventional impulse radar in which the reference wave is divided into many stages for generating the beat wave.

In addition, when the frequency of short-time switching (a short-time output change which cannot be implemented by the approaching hand of the predetermined object) of the detection output of the judging circuit part reaches a predetermined degree, processing means for setting a prohibition mode in which the detection output of the judging circuit part is invalidated may be provided in the object sensor of the present invention or the system to which the object sensor is applied. Thus, the processing means preferably has a function of canceling the prohibition mode when it is determined that the short-time switching of the detection output of the judging circuit part is stopped after the prohibition mode is set, or when a predetermined time passed after the prohibition mode is set.

Thus, even if error detection frequently occurs by rain drops having high permittivity, for example, the operation of the system (transmission of the seizing signal to the portable machine in the passive entry system, for example) caused by the error detection is stopped and the problem (the seizing signal is repeatedly transmitted to cause the vehicle battery to be wasted, for example) caused when the operation is repeated by the error detection can be avoided by such processing means. In addition, since the processing means has the function of canceling the prohibition mode, an adverse effect in which the operation of the system becomes impossible because the prohibition mode is kept set can be prevented.

Furthermore, the object sensor of the present invention is preferably used in a case where it is mounted on the vehicle such as a car to detect a hand of a user of the car approaching the handle (knob) of an opening and closing part (such as a door or a trunk), as a specific object (for example, for generating a trigger of a passive entry system in the car, for example), or used in a case where it is provided in a building to detect a hand of a user of the building approaching a handle of an opening and closing part (such as a door or a shutter) of the building, as the specific object (for example, for generating a trigger of a passive entry system in the building, for example) However, in this case, a transmission antenna constituting the detecting wave transmitting means and a receiving antenna constituting the reflected wave receiving mans are preferably provided in the handle, on the surface of the handle, in the opening and closing part or on the surface of the opening and closing part. Thus, the detection area having a preferable area is set in the vicinity of the handle without affecting the design of the handle or the opening and closing part, so that the hand to operate the handle can be detected with high reliability and high response.

In addition, although the transmission antenna and the receiving antenna may be arranged parallel to each other at the same place, they can be separately arranged on the handle side and the opening and closing part side (door side, for example) such that one may be provided in the handle or on the handle and the other may be provided in the opening and closing part or on the surface thereof. In this case, the minimum necessary detection area can be easily set at a preferable position (between the handle and the opening and closing part).

In addition, in the case the object sensor is provided in the handle to trigger the passive entry system, a detection area is preferably arranged on the inner side of an outer face of the handle. Thus, the problem such that the request signal is needlessly transmitted because the detection output is turned on by a hand of a person who is just near the handle can be effectively prevented.

In addition, the detection area preferably extends from the back side of the handle to the side the hand of the user is inserted so that the hand of the user approaching the handle to operate the handle is detected by the object sensor before it is inserted to the back side of the handle. In this constitution, the hand of the user to operate the handle can be quickly and appropriately detected, so that reliability and response of the sensor further improved.

The controller of the present invention is a-controller in a passive entry system provided in a vehicle or a building or in a tire pneumatic malfunction warning system, which comprises the object sensor as means for detecting the hand of the user of the vehicle or the building which approaches a handle of an opening and closing part of the vehicle or the building, as the specific object. The detection output of the object sensor is used as a trigger of the operation (automatic unlocking operation or the tire pneumatic malfunction warning operation) of the system.

According to this controller, the hand approaching the handle can be detected by the object sensor of the present invention with higher reliability and high response, and when a request signal is transmitted from the body machine provided in the vehicle or the building to the portable machine carried by the user, and the predetermine answer signal (portable machine answer signal) is transmitted from the portable machine to the body machine triggered by the above detection, an automatic unlocking operation (an operation automatically unlocking the opening and closing part such as the door in the locked state) or a tire pneumatic malfunction warning operation (an operation for outputting warning when tire pneumatic measurement data is obtained and the pressure is determined to be abnormal) are carried out.

Therefore, the convenience of the system can be sufficiently provided and the problem such that the system is needlessly operated (the request signal is needlessly transmitted and the battery of the vehicle is wasted or the standby power in the building is needlessly increased) by the error detection (erroneous generation of the trigger) can be considerably prevented. In additions since it is not necessary to change the configuration or the size of the handle of the opening and closing part, the degree of freedom in its design is not strictly limited. In addition, as described above, since the power consumption of the object sensor for generating the trigger is extremely low as compared with the constitution in which the conventional impulse radar is mounted for generating the trigger as it is, the power consumption in the building can be considerably lowered and the problem such that the battery of the vehicle runs out can be solved.

In addition, the transmission antenna of the body machine (the body machine transmission antenna) and the transmission antenna constituting the detecting wave transmitting means and/or the receiving antenna of the body machine (body machine receiving antenna) and the receiving antenna constituting the reflected wave receiving means may be constituted by a common antenna, so as to be simplified.

Furthermore, the body machine transmission antenna and/or the body machine receiving antenna are provided in the handle, on the surface of the handle, in the opening and closing part, or on the surface of the opening and closing part, together with the transmission antenna constituting the detecting wave transmitting means or the receiving antenna constituting the reflected wave receiving means or separately from these antennas.

BRIEF DESCRIPTION OF DRAWINGS

FIG. 2 is a view showing an essential constitution of the object sensor.

FIG. 3 is a view for explaining an operation of the object sensor.

FIG. 6 is a view for explaining an arrangement and a detection area of antennas.

FIG. 7 is a view for explaining another example of an arrangement and a detection area of the antennas.

FIG. 8 is a view for explaining another example of the arrangement of the antennas.

FIG. 10 is a view for explaining an example applied to a door (bar-type handle) of a building.

FIG. 11 is a view for explaining an example applied to a door (knob-type handle) of the building.

BEST MODE FOR CARRYING OUT THE INVENTION

The present invention is described in detail with reference to the accompanying drawings.

FIRST EMBODIMENT

Figure 1:
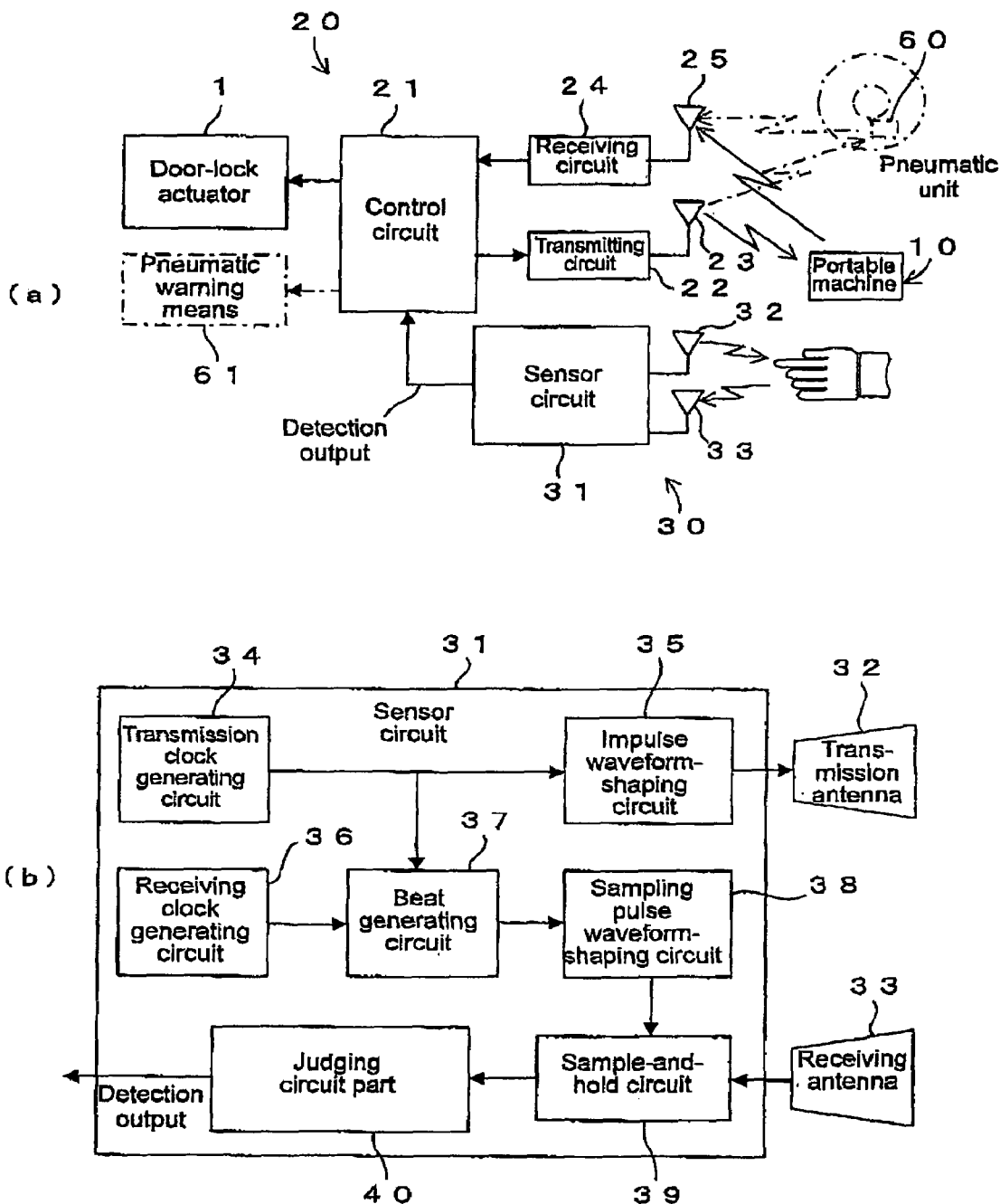
FIG. 1 is a view showing a whole constitution of a controller and an object sensor according to an embodiment of the present invention.

A first embodiment of the present invention is described. According to this embodiment, the present invention is applied to a controller of a passive entry system of a vehicle (or a tire pneumatic malfunction warning system). As shown in FIG. 1(*a*), this system comprises a portable machine 10, a body machine 20 and an object sensor 30 which are mounted on the vehicle.

The portable machine 10 comprises an antenna or a receiving circuit for receiving a seizing signal in a low frequency (LF) such as 100 to 150 kHz, a transmitting circuit or an antenna for wirelessly transmitting an answer signal or a manipulation signal (a locking manipulation signal or an unlocking manipulation signal) in a high frequency (a frequency in UHF band, for example) as will be described below, storing means (EEPROM, for example) on the portable machine side for storing at least a certification code (referred to as ID code also), a control circuit comprising a microcomputer for controlling the whole of the portable machine or for performing required information processing, and an internal battery although those are not shown.

In addition, the seizing signal described here is the signal which activates the microcomputer of the portable machine 10 from a WAIT mode (a low power consumption mode or also referred to as a sleep state for lowering the power consumption). In this case, the microcomputer of the portable machine 10 is programmed so as to wirelessly transmit the answer signal (portable machine answer signal) including the certification code through high-frequency radio waves when activated by the seizing signal. In this meaning, the seizing signal of the present invention corresponds to a request signal.

In addition, in this case, a power (at least a power at the time of activation) required for the portable machine 10 may be covered by a power transmitted from the body machine. In this case, since the transmission frequency from the body machine 20 to the portable machine 10 is low, the power transmission can be performed with relatively high efficiency through the radio waves, and the power required in the portable machine 10 can be all covered by the power transmitted from the body machine in principle, so that the internal battery of the portable machine is not necessary in this case.

In addition, on the surface of the portable machine 10, a locking switch or an unlocking switch (not shown) serving as a press-button type of operation part is provided, so that a remote operation as a normal keyless entry system (an unidirectional communication type) may be performed. That is, the portable machine 10 may have a function of transmitting the answer signal predetermined number of times in response to the seizing signal, and a function of wirelessly transmitting the locking manipulation signal including the certification code or the unlocking manipulation signal including the certification code, in response to the operation of the locking switch or the unlocking switch. When the locking manipulation signal or the unlocking manipulation signal is transmitted and received by the body machine 20, a door of the vehicle may be immediately locked or unlocked after the signal is cross-checked by a control function of the body machine 20.

In addition, although the portable machine 10 is constituted such that when the necessary operation (the transmission of the answer signal, for example) is completed, it automatically returns to the WAIT mode and keeps in the WAIT mode until it receives the next seizing signal or the like to lower the power consumption in this embodiment, the present invention is not always limited to this embodiment. For example, the portable machine 10 may be in standby mode normally, and enters an operation mode at predetermined timing to operate a receiving circuit intermittently to receive a signal intermittently. Thus, when the portable machine 10 receives the predetermined request signal (which is not the seizing signal but a signal just requiring the answer signal which may be a high-frequency signal as well as the low-frequency signal) wirelessly transmitted from the body machine 20 in the above intermittent receiving operation, the portable machine 10 may wirelessly transmit the answer signal including the certification code registered in the storing means on the portable machine side the predetermined number of times in response to the request signal.

Meanwhile, as shown in FIG. 1(a), the body machine 20 comprises a control circuit 21, a transmitting circuit 22 and a transmission antenna 23 (body machine transmission antennas), and a receiving circuit 24 and a receiving antenna 25 (body machine receiving antennas). The transmitting circuit 22 and the transmission antenna 23 in this case transmit the above low-frequency seizing signal, and the receiving circuit 24 and the receiving antenna 25 receive the above high-frequency answer signal or the manipulation signal. The control circuit 21 corresponds to processing means of the present invention and comprises a microcomputer for performing necessary operations in controlling the whole of the body machine or in controlling a door-lock actuator 1 of the vehicle. In this case, it incorporates storing means (EEPROM, for example) on the body machine side for storing the certification code.

In addition, the control circuit 21, the transmitting circuit 22 and the receiving circuit 24 are provided in a control unit (ECU) set inside the door of the vehicle, for example. In addition, the transmission antenna 23 and the receiving antenna 25 may be provided in the control unit or may be provided in another place (a room mirror, a door mirror, a door handle, or the like).

Next, a description is made of the object sensor 30.

The object sensor 30 in this case is a door handle sensor which detects a body (a hand or a finger, for example) of a user of the vehicle which comes in close to the door handle of the vehicle, and generates a detection output which triggers an automatic unlocking operation of the door, which is shown in FIG. 1(b). That is, the object sensor roughly comprises a sensor circuit 31, a transmission antenna 32 and a receiving antenna 33. The sensor circuit 31 comprises a transmission clock generating circuit 34, an impulse waveform-shaping circuit 35, a receiving clock generating circuit 36, a beat generating circuit 37, a sampling pulse waveform-shaping circuit 38, a sample-and-hold circuit 39 and a judging circuit part 40.

In addition, the transmission clock generating circuit 34, the impulse waveform-shaping circuit 35 and the transmission antenna 32 are components corresponding to detecting wave transmitting means of an impulse radar, and the receiving clock generating circuit 36, the beat generating circuit 37, the sampling pulse waveform-shaping circuit 38 and the sample-and-hold circuit 39 and the receiving antenna 33 are components corresponding to reflected wave receiving means of the impulse radar.

The sensor circuit 31 may be provided in the control unit together with the control circuit 21 and the like or may be housed in the door handle.

Here, the transmission clock generating circuit 34 is a circuit for generating a reference wave of the impulse radar (455 kHz, for example) which comprises an oscillation circuit in which a crystal oscillator is an oscillation source as shown in FIG. 2(a). In addition, the receiving clock generating circuit 36 is a circuit for generating a beat wave (1 kHz, for example) of the impulse radar, which is constituted by a modified Colpitts oscillator in which current consumption is low shown in FIG. 2(b) separately from the transmission clock generating circuit 34.

In addition, according to the conventional impulse radar used in a land-mine detection equipment or the like, a dividing circuit for dividing an output from a circuit for generating the reference wave many times is provided to generate the beat wave from the reference wave. However, in this case, since a large current is consumed by the dividing circuit, it is difficult to apply the conventional impulse radar to the object sensor 30 as it is in this respect (the battery of the vehicle could run out). However, the above problem can be solved by generating the beat wave by the separate oscillation circuit whose current consumption is low as described in this embodiment.

The impulse waveform-shaping circuit 35, the beat generating circuit 37, the sampling pulse waveform-shaping circuit 38 and the sample-and-hold circuit 39 are the same components as in the conventional impulse radar, which are briefly described hereinafter.

The impulse waveform-shaping circuit 35 shapes the waveform generated by the transmission clock generating circuit 34 and inputs it to the transmission antenna 32 as a predetermined rectangular wave (pulse)- Thus, the transmission antenna 32 is periodically turned on and off, and a predetermined transmission wave (which is a frequency component limited by a band width of the transmission antenna 32 and includes a harmonic wave) is output.

The beat generating circuit 37 is a circuit for generating a sampling pulse (having a fluctuation component corresponding to the beat wave) in which the waveform of the reference wave is changed by the beat wave. The sampling pulse waveform-shaping circuit 38 shapes the waveform generated by the beat generating circuit 37 and input is to the sample-and-hold circuit 39. Then, the input from the receiving antenna 33 and the output of the sampling pulse waveform-shaping circuit 38 are mixed in the sample-and-hold circuit 39, and a predetermined low-frequency component (including a component of a reflection wave from a detected object) is extracted among the inputs from the receiving antenna 33 and output. In addition, technique for adding the fluctuation component corresponding to the beat wave to the sampling pulse is one method to receive an appropriate reflection wave with high efficiency in the impulse radar.

As shown in FIG. 2(c), the judging circuit part 40 comprises a low-pass amplification circuit (AMP) 41, an envelope detection circuit 42, a band-pass filter (BPF) 43, a comparator 44, and an interface (I/F) 45.

Here, the low-pass amplification circuit 41 is a circuit for amplifying the output of the sample-and-hold circuit 39 to a level such that it can be easily handled, which is not always necessary in theory. In addition, the envelope detection circuit 42 detects the envelope in the output of the low-pass amplification circuit 41 and previously removes an extra component (a high-frequency component other than the fluctuation component as will be described below). As shown in FIG. 3(a), in the output of the envelope detection circuit 42, there is provided a waveform mainly comprising the fluctuation component when the object such as the hand approaches the antennas 32 and 33. Here, the frequency of the fluctuation component is increased or decreased corresponding to the moving speed of the object such as the hand (when the moving speed is high, the frequency is increased) In addition, this envelope detection circuit 42 is also not always necessary in theory. The extra component may be removed in the subsequent band-pass filter 43 in a case the envelope detection circuit is not provided. However, when the envelope detection circuit 42 is provided, since the extra component can be previously removed, the signal processing can be performed with high efficiency.

In addition, the band-pass filter 43 only outputs a signal component in the frequency range (1 Hz to several 10s of Hz in this case) corresponding to the speed range of the specific object (the hand in this case) to be detected, among the outputs of the envelope detection circuit 42. The comparator 44 compares an amplitude level of the output of the band-pass filter 43 with a threshold value corresponding to a lower limit of a predetermined range corresponding to properties (mainly permittivity) of the hand in this case, and when the amplitude level is within the predetermined range (that is, when it exceeds the threshold value), the output (detection output) is turned on. Then, the interface 45 converts the output of the comparator 44 to a required signal configuration and inputs it to the control circuit 21 as the detection output of the specific object.

According to this judging circuit part 40, when the output characteristic values (the frequency and the amplitude level) of the envelope detection circuit 42 exist in a judging region shown in FIG. 3(b), it is determined that the specific object (the hand) to be detected approaches the antennas -32 and 33, and the detection output is turned on.

In addition, the amplitude level described here is a parameter corresponding to the intensity of the receive wave (the reflection wave), which is increased or decreased depending on the permittivity of the approaching object mainly if the difference in distance from the antennas is neglected. Therefore, since a waveform component of a foreign object having permittivity different from the specific object is lower than the threshold value and not in the judging region even if its frequency (that is, the approaching speed of the foreign object) is the same as that of the specific object, it is not detected. In this case, since permittivity of water, paper, plastic or the like is substantially lower than that of someone's hand, such object can be removed by the comparator 44 with high reliability. That is, even when a piece of paper, a dead leaf or the like approaches the antennas 32 and 33 at almost the same speed of someone's hand, an error in which the detection output is turned on is not generated.

In addition, the frequency (frequency of the component of the reflection of the object) of the output characteristic values of the envelope detection circuit 42 corresponds to the moving speed of the approaching object as described above. Therefore, even if the amplitude level (that is, the permittivity of the foreign object) of the waveform component of the foreign object having the moving speed different from the specific object is almost the same as that of the specific object, since it is out of the characteristic range of the band-pass filter 43 and the judging region, it is not detected. In this case, a falling object moving faster than someone's hand or an object extremely moving slowly (including a static object), for example is removed by the operation of the band-pass filter 43 with high reliability, even if it has the same permittivity as someone's hand (metal, for example). For example, even when the vehicle is parked in a state the antennas 32 and 33 are in close to a metal pole, the metal pole is not kept detected as someone's hand. In addition, even if rain drops having high permittivity fall, error detection can be avoided with high probability.

Therefore, according to the object sensor 30 in this case, when someone's hand approaches, the detection output is surely turned on, and even when the foreign object approaches or the environment changes, error detection is hardly generated (at least the problem such that the error detection is repeatedly continued can be avoided with high reliability).

Then, as shown in FIG. 5(a), for example, the transmission antenna 32 and the receiving antenna 33 are simple bar shape in line with a door handle configuration, which are provided so as to be buried in (or attached to) the door handle or the door, in parallel or separately. The antennas may have various kinds of constitutions (a shape, arrangement, a manufacturing method or the like), as will be described below.

Next, a description is made of a function of the control circuit 21 and the operation of the system.

The control circuit 21 has the function of carrying out the following processing operations, for example. That is, basically, in the case the door of the vehicle is in a locked state (the door-lock actuator 1 is on), when the detection output of the object sensor 30 is turned on, the above seizing signal is transmitted from the transmitting circuit 22 and the transmission antenna 23 predetermined number of times and the receiving circuit 24 performs a receiving operation. Then, when the answer signal is received from the portable machine 10 after the seizing signal is transmitted, it is determined whether the certification code included in the answer signal,corresponds to the certification code previously registered in the storing means on the body machine side or not. When the determination result is affirmative, it means that the cross-check is confirmed, so that the door-lock actuator 1 is controlled so as to unlock the door of the vehicle in the locked state.

In addition, the control circuit 21 in this example sets a prohibition mode (in which the seizing signal is not transmitted even when the detection output is turned on) when the frequency of short-time switching of the detection output of the object sensor 30 (short-time change in output which cannot be generated by the movement of someone's hand) reaches a predetermined degree as shown in FIG. 3(*c*), for example. More specifically, when the number of times the detection output is switched from on to off is the predetermined number of times or more within a predetermined time, or when the change in which the detection output is switched from off to on and to off again is continued the predetermined number of times or more within the predetermined time, for example, the prohibition mode is set. According to FIG. 3(*c*), the prohibition mode is set when the number of times the detection output is switched from off to on is four or more within a predetermined time T1.

In addition, the prohibition mode is canceled when the control circuit 21 determines that the short-time switching of the detection output of the object sensor 30 is stopped after the prohibition mode is set, or when a predetermined time just passed after the prohibition mode is set. For example, as shown in FIG. 3(*c*), when the detection output of the object sensor 30 is kept on for a predetermined time T2 or more in the prohibition mode, the prohibition mode is canceled. In addition, besides the above example, the prohibition mode is canceled when the detection output of the object sensor 30 is kept off for the predetermined time T2 or more, or the prohibition mode may be unconditionally canceled when a predetermined time (several minutes to several tens of minutes) passed after the prohibition mode is set.

Figure 4:
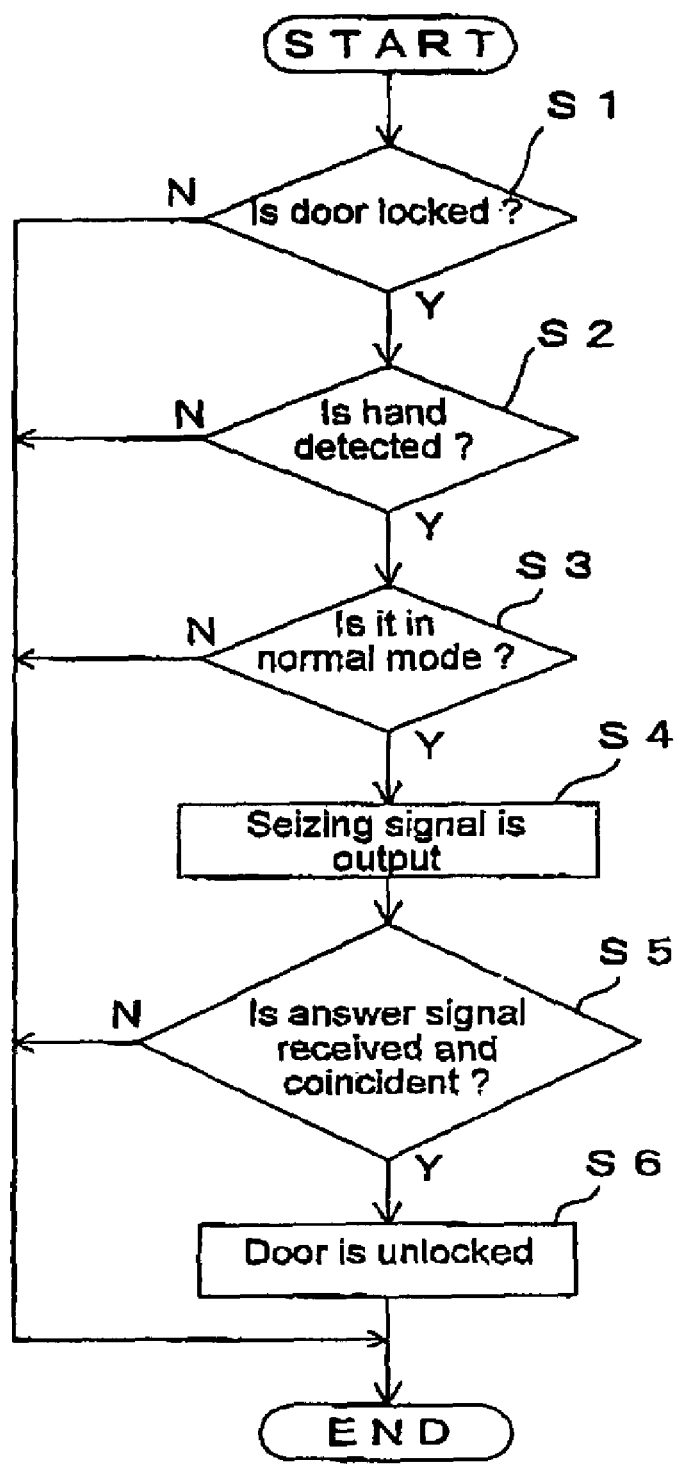
FIG. 4 is a flowchart showing control contents of the controller.

FIG. 4 is an example of a flowchart implementing the above control processes (excluding the setting and canceling processes of the prohibition mode) of the control circuit 21. In this case, the control circuit 21 periodically carries out the processes shown in FIG. 4.

It is determined whether the door is in a locked state or not at step S1 and when it is not, a sequence of processes is completed. Meanwhile, when it is in the locked state, it is determined whether the hand is detected or not at step S2 (that is, whether the detection output of the object sensor 30 is on or not), and when it is detected, the operation proceeds to step s3.

It is determined whether the mode is a normal mode or not (that is, whether the prohibition mode is set or not), and when it is the normal mode, the operation proceeds to step S4, in which the transmitting circuit 22 is controlled so as to transmit the seizing signals predetermined number of times.

Then, the answer signal is received and it is determined whether cross-check of the certification code included in the answer signal is appropriately performed or not at step S5. When the cross-check is appropriately performed, the door-lock actuator 1 is controlled to unlock the door at step S6.

When the determination results at steps S2, S3 and S5 are negative, the sequence of processes is completed similar to step S1.

According to the above-described object sensor 30 and the controller using this sensor in this embodiment, the following effects can be provided.

(1) Since the hand approaching the door handle is detected using the impulse radar in a contactless manner, error detection caused by a stain does not occur and possibility the error detection caused by a foreign object (rain or a dead leaf, for example) occurs is considerably lower than in a case of the conventional optical sensor and the like. Especially, according to this sensor, since someone's hand is discriminated from another foreign object, based on both intensity (amplitude level) and the frequency of the reflection wave, the possibility the foreign object other than the hand is erroneously detected is extremely low. Therefore, the problem such that the sensor is unnecessarily operated by the error detection (the problem such that the seizing signal is unnecessarily transmitted and the battery of the vehicle is wasted in this case) can be extremely prevented from occurring.

(2) Since a detection area can be set appropriately large enough by setting a transmission output or reception sensibility of the impulse radar, enough response can be provided. In this case, since the hand of the user can be detected at a position sufficiently before the position of the door handle, when the user starts to pull the door handle to open the door, the vehicle door has been automatically and surely unlocked and convenience of the passive entry system can be satisfactorily provided.

(3) Since the impulse radar is used, it is not always necessary to provide the whole components (the sensor circuit. 31 and the like in this case) of the object sensor 30 at a predetermined position (the door handle of the vehicle in this case) in which the object approaching is detected. That is, at least the antennas 32 and 33 of the impulse radar may be set at a predetermined position (door handle) or in the vicinity thereof. In addition, according to this sensor, since the detection is judged by the frequency and the amplitude level of the reflection wave signal and the microcomputer is not used in the judging process, the constitution of the sensor circuit 31 is simplified and miniaturized, so that the whole of the object sensor 30 including the sensor circuit 31 can be relatively easily incorporated in the door handle. Therefore, it is less necessary to change the configuration or the size of the door handle at the predetermined position (or in the vicinity thereof), and a degree of freedom in its design is not strictly limited.

(4) According to the object sensor 30, the microcomputer is not used in the judging process as described above. More specifically, the detection can be judged with high reliability by a simple processing in the simple judging circuit part 40 comprising the band-pass filter 43 and the comparator 44. Therefore, the power consumption can be considerably lowered as compared with the conventional impulse radar which performs a complicated judging process by a microcomputer. As a result, the sensor can be mounted on the vehicle as a trigger of the passive entry system without any problem (the problem such that the battery of the vehicle could run out is solved) Especially, in this embodiment, since the transmission clock generating circuit 34 and the receiving clock generating circuit 36 are constituted by the separate oscillation circuits, the process for dividing the reference wave into many stages to generate the beat wave is not necessary. Therefore, in this respect also, the power is saved and the power consumption of the object sensor 30 can be especially reduced.

(5) When the control circuit (processing means) sets the prohibition mode which invalidates the detection output of the judging circuit part 40 (mode which prohibits the transmission of the seizing signal) when the frequency of short-time switching (short-time change in output which cannot be implemented when someone's hand approaches) of the detection output of the judging circuit part 40 reaches the predetermined degree. Therefore, if error detection frequently occurs by rain drops having high permittivity, for example, the operation of the system (transmission of the seizing signal in this case) caused by the error detection is stopped and the problem caused when the operations are repeated by the error detection (the seizing signals are repeatedly transmitted to cause the vehicle battery to be wasted in this case) can be avoided.

In addition, according to this embodiment, since the prohibition mode is automatically canceled at an appropriate time by the above function of the control circuit 21, an adverse effect in which the operation of the system becomes impossible because the prohibition mode is kept set and the automatic unlocking operation of the passive entry system cannot be used can be prevented. For example, even if the prohibition mode is set because of rain, since the prohibition mode is automatically canceled when the above predetermined time passes after the rain stops or when someone's hand is detected, the problem such that the passive entry system cannot be used by the setting of the prohibition mode hardly occurs.

Next, a description is made of various aspects of the arrangements, configurations or the like of the antenna in the controller of the vehicle with reference to FIGS. 5 to 9.

Figure 5:
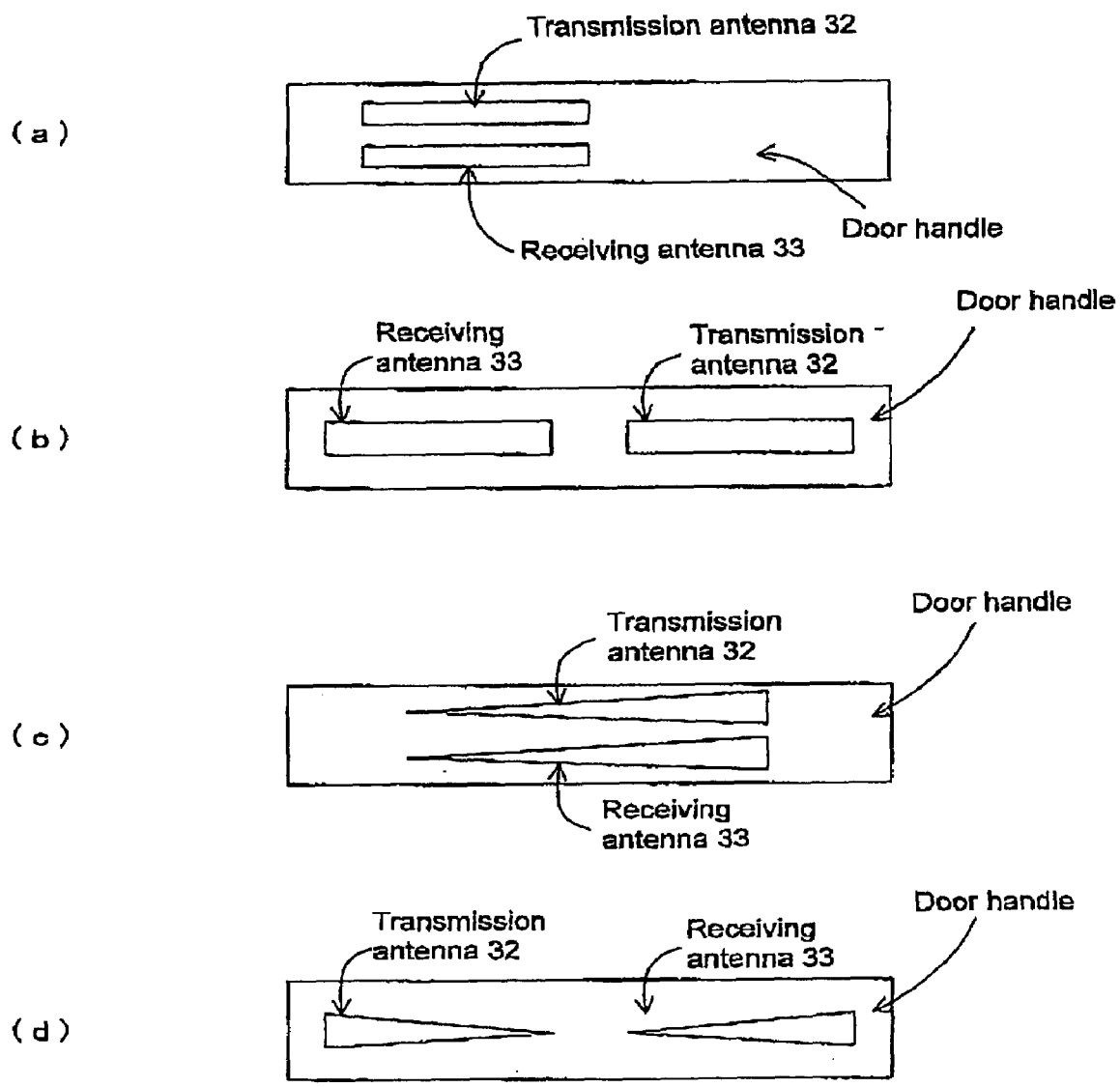
FIG. 5 is a view showing a configuration and an arrangement of antennas.

The transmission antenna 32 and the receiving antenna 33 of the object sensor 30 may be arranged parallel to the door handle as shown in FIG. 5(*a*), or may be linearly arranged as shown in FIG. 5(*b*).

Alternatively, as shown in FIGS. 5(*c*) and 5(*d*), they may have a triangle configuration. In this case, the band of the electric wave to be transmitted or received is increased and detection precision or efficiency of the signal processing can be improved, so that the object can be detected in a larger range (a longer detection distance).

In addition, the transmission antenna 32 and the receiving antenna 33 may be arranged on the back side of the door handle as shown in FIG. 6(*a*), for example and preferably a wave absorber 50 is arranged on the external side of the door handle. In this constitution, as shown in FIG. 6(*b*), a detection area can be easily set such that the detection area may be positioned on the inner side of the external face of the door handle. When the detection area is positioned on the inner side of the external face of the door handle, the problem such that the detection output is needlessly turned on by a hand of someone who is just in the vicinity of the door handle and the seizing signal is unnecessarily transmitted can be effectively prevented.

In addition, the detection area of the object sensor 30 is preferably arranged as follows by minutely setting the arrangement or the position of the transmission antenna 32, the receiving antenna 33 or the wave absorber 50. That is, it is preferable that the detection area of the object sensor 30 extends from the back side of the door handle toward the direction the hand of the user is inserted so that the hand of the user approaching to operate the door handle can be detected by the object sensor 30 before it is inserted in the back side of the door handle. For example, in a case the hand of the user is inserted from above, a detection area B in FIG. 6(*b*) which extends upward (or may slant upward) is more preferable than a detection area A in FIG. 6(*b*). Thus, the hand of the user to operate the door handle can be quickly and accurately detected and the reliability and response can be further improved.

Furthermore, the transmission antenna 32 and the receiving antenna 33 may be separately arranged on the handle side and the door side, respectively. For example, as shown in FIG. 6(*c*), the transmission antenna 32 may be arranged on the back face of the door handle, the receiving antenna 33 may be arranged on a surface of the door which is opposed to the back face of the door handle, and the wave absorber 50 may be arranged on the external face of the door handle. In this constitution, bare essentials of detection area can be easily set at the preferable position (between the handle and the door) as shown in FIG. 6(*b*). In addition, since the unnecessary radiation of the wave toward the outside of the handle can be surely prevented, it can be easily adapted to the standard of law about radio wave.

FIG. 7 is a view showing an arrangement example of the antenna and the like in a case of a movable door handle. In this case, the door handle is mounted on a concave part formed in the door and the user inserts the hand from beneath and pulling it up to open the door. In this kind of door handle also, the transmission antenna 32 and the receiving antenna 33 can be provided in the door handle but in this case the transmission antenna 32 and the receiving antenna 33 may be arranged on the upper face in the concave part as shown in FIG. 7(*a*). Thus, the preferable detection area can be easily set as shown in FIG. 7(*b*), and the effect such that error detection is prevented, the response is improved and unnecessary wave radiation is excluded can be easily provided. In addition, since it is not necessary to provide a wiring between the door handle and the door which are relatively displaced, the wiring between the antennas 32 and 33 and the sensor circuit 31 can be easily provided. In addition, the sensor circuit 31 in this case may be arranged in the back of the concave part as shown in FIG. 7(*a*).

FIG. 8 is a view showing an example in which the transmission antenna 23 of the body machine 20 for transmitting the seizing signal is arranged at the door handle together with the antennas 32 and 33 of the object sensor 30, and the object sensor 30 is used as a trigger of the tire pneumatic warning system.

As shown in FIG. 8(*a*), when the transmission antenna 23 is arranged in the door handle, a preferable communication area for transmitting the seizing signal to a pneumatic unit 60 (designated by a dotted line in FIG. 1) provided in the tire can be set as shown in FIG. 8(*b*), for example. Thus, the seizing signal (the low-frequency signal in this case) is transmitted to the pneumatic unit 60 when someone's hand is detected by the object sensor 30, and necessary warning based on a pneumatic measurement result may be output from pneumatic warning means 61 (designated by a dotted line in FIG. 1) connected to the control circuit 21.

Here, the pneumatic unit 60 is activated by receiving the seizing signal and wirelessly transmits an answer signal (pneumatic unit answer signal) including pneumatic measurement data at that time. Then, the answer signal is received by the receiving antenna 25 and the receiving circuit 24 of the body machine 20 and read by the control circuit 21. When the pneumatic measurement data included in the received answer signal is out of a predetermined appropriate range, the control circuit 21 controls the pneumatic warning means 61 so as to output the warning of the pneumatic malfunction. The pneumatic warning means 61 informs the vehicle user of the pneumatic malfunction by warning sound, warning light, character display or their combination and it may display the degree of malfunction as well as the generation of the malfunction. In addition, the pneumatic warning means 61 may warn by a lamp or the like in an instrument panel and the like in the vehicle but in this case, it preferably has a function of outputting the warning sound which can be heard at the outside of the vehicle so that the user at the outside of the vehicle (the user who is operating the door handle to get in the vehicle) can know the malfunction.

FIG. 8(*c*) is a flowchart showing an example of a concrete control processes of the control circuit 21 in this embodiment. According to this flowchart, steps S7 to S9 are added to the flowchart in FIG. 4, and the steps S1 to S6 are the same as those in FIG. 4 (the step S1 to S5 are omitted in FIG. 8(*c*)). The added steps are described hereinafter. The seizing signal is transmitted to the pneumatic unit 60 and the answer signal is received from the pneumatic unit 60 so that the updated pneumatic measurement data is read at step S7, which is performed after the step S6 (refer to FIG. 4). Then, it is determined whether the read pneumatic measurement data is out of the predetermined appropriate range or not at step S8. When it is, the malfunction warning as described above is output at step S9. Alternatively, when it is not, a sequence of processes is completed.

According to this processing, when the hand is detected by the object sensor 30 in the door locked state and in a normal mode, and cross-check between the portable machine 10 and the body machine 20 is confirmed, the body machine 20 communicates with the pneumatic unit 60 and the malfunction warning is output when the air pressure is abnormal.

Therefore, according to this embodiment, when the user having the appropriate portable machine 10 extends the hand toward the door handle to open the locked door, the door is immediately and automatically unlocked and then the pneumatic malfunction determination of the tire is made and the malfunction warning is output when the air pressure is abnormal.

Therefore, the object sensor 30 for generating the trigger and the body machine 20 comprising the control circuit 21 are shared between the passive entry system and the tire pneumatic warning system, so that high functioning of the vehicle can be implemented at low cost.

In addition, as compared with the conventional common tire pneumatic warning system, there can be provided an effect such that the battery consumption is low and the malfunction due to diffraction of the wave hardly occurs. That is, according to the conventional tire pneumatic warning system, an electric wave of UHF band is periodically transmitted from the body machine to operate the pneumatic unit 60 and pneumatic malfunction determination is periodically made regardless of an operation of the user and the like in general. Therefore, the above operation of the tire pneumatic warning system comprising transmission and reception of waves are repeatedly performed even while the vehicle is parked for a long time, so that the battery is consumed. In addition, since the waves of UHF band in which the wave is likely to be diffracted is used in the conventional case, a pneumatic unit of another adjacent vehicle is also operated and the signal from the pneumatic unit 60 of another vehicle is received for the signal of its own vehicle, so that the pneumatic malfunction determination could not be appropriately made. Meanwhile, according to this embodiment, since the electric wave is transmitted to the pneumatic unit 60 to determine the pneumatic malfunction only when the hand of the user having the portable machine approaches the predetermined detection area in the vicinity of the door handle, the power consumption for pneumatic malfunction determination can be kept to the requisite minimum. In addition; according to this embodiment, since the electric wave of the seizing signal to the pneumatic unit 60 is a wave of LF band in which it is not likely to be diffracted, the above problem is hardly generated.

Furthermore, since the antenna of the conventional tire pneumatic warning system is arranged in a tire house, it is necessary to provide wiring to each tire house and there is a problem in reliability because it is exposed to a bad environment. In the meantime, according to this,embodiment, since the antenna is arranged in the door handle, the air pressure of the front and rear tires can be confirmed by way of the antenna arranged in the door handle, so that the number of wirings can be reduced. Furthermore, since the environment of the door handle is better than that of the tire house, breakdown is not likely to occur and the reliability of the system is improved.

Figure 9:
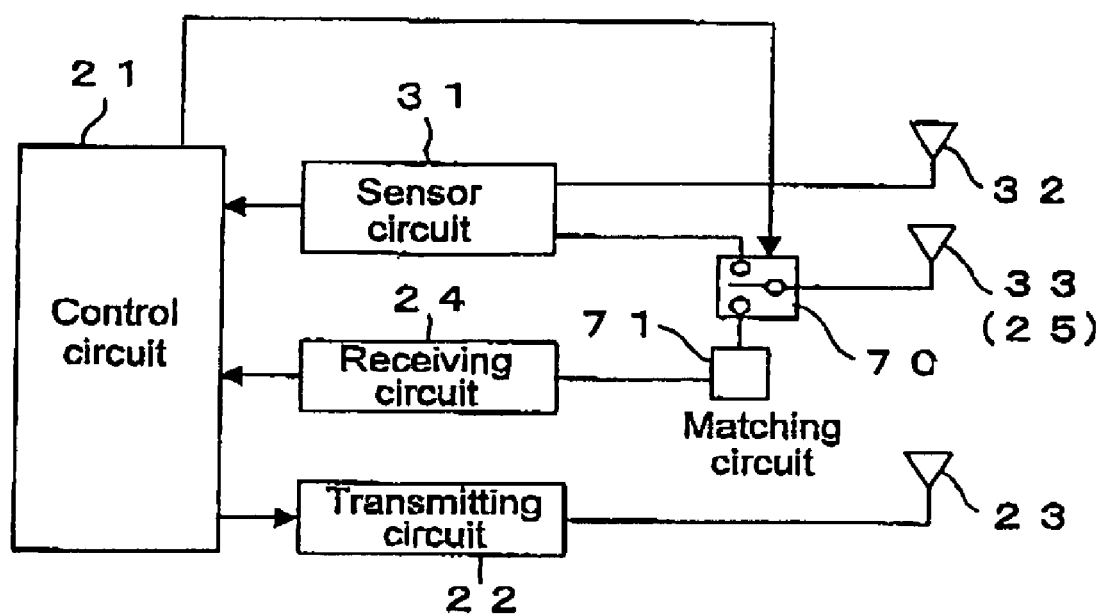
FIG. 9 is a view showing a constitution example when the antenna is shared.

FIG. 9 is a view showing an example in which the receiving antenna 33 of the object sensor 30 and the receiving antenna 25 of the body machine 20 for receiving the answer signal are incorporated. Referring to FIG. 9, reference numeral 70 designates an antenna switch for selectively connecting the common receiving antenna 33 (25) to either one of the sensor circuit 31 or the receiving circuit 24, which comprises an electromagnetic relay and the like controlled by the control circuit 21. In addition, reference numeral 71 designates a matching circuit which performs signal conversion to match the difference in frequency band. In this constitution, since the receiving antenna is shared, the cost can be reduced and the sensor can be miniaturized because the number of parts is reduced.

SECOND EMBODIMENT

Next, a second embodiment is described with reference to FIGS. 10 and 11. According to this embodiment, the present invention is applied to a controller in a passive entry system of a building (residence or an office, for example) FIGS. 10(*a*) and 11(*a*) are front views of a door of the building, FIGS. 10(*b*) and 11(*b*) are sectional views of the door and FIG. 11(*c*) is an enlarged front view of the door. The same components as in the first embodiment are allotted to the same reference numerals and descriptions of them are omitted.

The circuit constitution and its processing contents may be the same as in the first embodiment shown in FIGS. 1 to 4. Arrangement of each component may be as follows, for example.

In a case of a bar-shaped door handle as shown in FIG. 10(*a*), a transmission antenna 32 and a receiving antenna 33 of an object sensor 30 are formed to a simple bar shape so as to correspond to the door handle and each component is arranged as shown in FIG. 10(*b*). That is, a door-lock actuator 1, a wireless unit 80 of a body machine 20, a control circuit 21 and a sensor circuit 31 of the object sensor 30 are arranged in the door, the transmission antenna 32 of the object sensor 30 is arranged on an inner face of the door handle and the receiving antenna 33 of the object sensor 30 is arranged on the surface of the door opposed to the above inner face of the door handle. Here, the wireless unit 80 comprises a transmitting circuit 22, a transmission antenna 23, a receiving circuit 24 and a receiving antenna 25 of a body machine 20.

Alternatively, in a case of a knob-type door handle, for example, the transmission antenna 32 and the receiving antenna 33 of the object sensor 30 are in the shape of semicircles so as to correspond to the shape of the door handle and arranged as show in FIGS. 11(b) and 11(c). That is, the door-lock actuator 1, the wireless unit 80 of the body machine 20, the control circuit 21 and the sensor circuit 31 of the object sensor 30 are arranged in the door, the transmission antenna 32 of the object sensor 30 is arranged on the door surface (along the upper half of the door handle) and the receiving antenna 33 of the object sensor 30 is arranged on the door surface (along the lower half of the door handle).

In this constitution, the same kind of effects as in the first embodiment can be provided in the passive entry system of the building. In addition, as a power supply of the system in this embodiment, a commercial power supply may be converted to a predetermined voltage to be used or an internal battery may be used. In either case, the power is saved by applying the present invention. That is, in the case the commercial power supply is used, an increase in standby power consumption at home and the like can be prevented, and in the case the internal battery is used, the life can be kept long until the battery is changed.

In addition, the present invention is not limited to the above embodiments and various kinds of variations and modifications can be implemented.

For example, although there are shown only the concrete examples for unlocking operation of the door of the vehicle or the building in the above embodiments, the present invention is not limited to unlocking operation of the door and the like, and there are various kinds of control objects and control contents. For example, the object sensor of the present invention can be used for generating a trigger of an automatic locking operation of the passive entry system. Alternatively, it can be applied to automatic unlocking or automatic locking operation of a trunk of a vehicle in such a manner that the hand of the user approaching a handle to open or close the trunk is detected by the object sensor of the present invention. Furthermore, other than the vehicle, it can be applied to automatic unlocking and the like of a door of a ship or a small craft, for example.

In addition, although the example in which someone's hand is detected is shown in the above embodiments, an object other than the hand (rain drops, for example) can be detected as the specific object (detection object) which is discriminated from other objects, by changing the characteristics (the characteristics of the band-pass filter or the comparator, for example) of the judging circuit part.

Furthermore, each antenna of the object sensor or the body machine may be manufactured of metal, an electrically conductive resin or the like, separately from a mounting part and fixed to the mounting part (the inside or the surface of the door handle) by press fitting, screw cramp or the like. Alternatively, it may be formed by insert molding in the door handle or the door made of a resin, for example Still further, the antenna may be made of electrically conductive resin in the resin door handle or the door by so-called two-color molding. Alternatively, the antenna may be formed by plating on the resin.

The control contents of the body machine is also not limited to the one illustrated in FIG. 4 or 8(c) For example, the step S1 may be omitted from the flowchart in FIG. 4. However, when the step S1 is omitted, even in the case the door is in the unlocked state, if it is in the normal mode, communication with the portable machine is established every time the hand is detected, so that the unlocking control could be needlessly carried out. Meanwhile, when there is the judging operation such as the step S1, the above problem can be solved. In addition, the above-described prohibition mode may not be set and the step S3 in the flowchart shown in FIG. 4 can be omitted because the function of setting the prohibition mode is provided just in case the error detections continuously occur because of rain drops or the like.

In addition, although the function of warning the malfunction of the tire pressure is implemented by the process (FIG. 8(c)) integrated with the automatic unlocking operation of the passive entry system, by using the common body machine and the object sensor with the passive entry system in the above embodiment, it can be implemented by the body machine or the object sensor provided separately from that of the passive entry system or can be implemented by a separate process (process irrelevant to the operation of the entry system) using the same body machine. For example, the object sensor of the present invention may be mounted on the door handle to detect the user's hand and only to generate the trigger of the malfunction warning function of the tire pressure. Alternatively, the steps S7 to S9 in FIG. 8(c) may be unconditionally carried out when someone's hand is detected, for example. However, in the case of the processing contents (combined with the processes in FIG. 4) according to the above embodiment described with reference to FIG. 8(c), the pneumatic malfunction warning function of works only when the door is in the locked state and in the normal mode, and the hand of the user having the appropriate portable machine approaches the door handle. Therefore, the above processing contents in the above embodiment are advantageous when it comes to wirelessly communicating with the pneumatic unit with the frequency of requisite minimum as much as possible to save the battery power.

In addition, the request signal according to the present invention is not limited to the seizing signal which activates the portable machine and the like in a sleep state (WAIT state of the microcomputer), and it may be a signal which requires transmission of the predetermined answer signal only, to the portable machine or the pneumatic unit in the activated state already (including the standby state of the microcomputer). In addition, the wireless frequency of this request signal is not limited to the LF band, it may be another band (UHF band, for example). However, the LF band is advantageous when it comes to the fact that the electric wave is not likely to be diffracted, so that a power can be transmitted with relatively high efficiency.

In addition, the request signal may comprise some unique code (which is preferably not the certification code for unlocking and the like in view of security). For example, since the entry system of the vehicle is used in the circumstances there are some vehicles incorporating the same kind of entry system near the vehicle in some cases, the answer signal may be returned after cross-check of the unique code is performed in the portable machine for discrimination from others, so that the portable machine may not receive the request signal output from the body machine of the other vehicle and the portable machine may not transmit the answer signal including the certification code in each case, in the above circumstances.

Although the receiving antenna is shared in the above example in FIG. 9, the transmission antenna of the body machine and the transmission antenna of the object sensor can be constituted by a common antenna provided that there is no problem in the difference of the frequency band and the like to be used. In some cases, both receiving antenna and the transmission antenna may be incorporated. In this case, since there are only two kinds of antennas on the whole, the sensor can be extremely simplified.

Although the example in which the transmission antenna of the body machine is also provided in the door handle is shown in FIG. 8(a), the receiving antenna of the body machine may be also provided in the door handle.

INDUSTRIAL APPLICABILITY

As described above, according to the present invention, there is provided the object sensor excellent in operation reliability and response, further excellent in mountability (dominance such as in size and design) on a vehicle using technique of the impulse radar, and much less in power consumption than the conventional impulse radar, and an excellent controller (a controller in a passive entry system and the like) using the above object sensor.

As industrial applicability, the object sensor of the present invention is preferably used in the case where it is mounted on a vehicle such as a car to detect a hand of a user of the car approaching the handle (knob) of an opening and closing part (such as a door or trunk), as a specific object (for example, for generating a trigger of a passive entry system in the car, for example), or used in the case where it is provided in a building to detect a hand of a user of the building approaching a handle of an opening and closing part (such as a door or a shutter) of the building, as a specific object (for example, for generating a trigger of a passive entry system in the building, for example). Furthermore, it is suitable for being used in a tire pneumatic malfunction warning system.

The object sensor can be applied to the vehicle on land, at sea and in air, and the vehicle may have two wheels, three wheels, four wheels and the like.

In addition, the building comprises a general building, an office building, a residence, a villa, a hotel, a warehouse, an exhibition hall, a barn, a shelter, an asylum and the like.

Furthermore, the controller according to the present invention is a controller in the passive entry system or the tire pneumatic malfunction warning system which is provided in the vehicle or the building and comprises the object sensor of the present invention as means for detecting the hand of the user of the vehicle or the building approaching the handle of the opening and closing part of the vehicle or the building as the specific object. The detection output of the object sensor can be preferably used as a trigger of the operation (the automatic unlocking operation or the tire pneumatic malfunction warning operation) of the system.

The invention claimed is:

1. An object sensor for detecting that a specific object approaches in a specific speed range, comprising:
    detecting wave transmitting means and reflected wave receiving means of an impulse radar; and
    a circuit for generating a sampling pulse,
    a sample-and-hold circuit mixes the signal based on the sampling pulse and the signals received by the reflected wave receiving means, and extracts a predetermined low-frequency component,
    a judging circuit part comprises:
    a filter for only outputting the signal component in a frequency range corresponding to the speed range, among the signals extracted as the predetermined low-frequency component; and
    a comparator for comparing the amplitude level of the output of the filter with a threshold value corresponding to a boundary of the predetermined range and turning on the detection output when the amplitude level is in the predetermined range.

2. The object sensor according to claim 1, wherein a transmission clock generating circuit of the detecting wave transmitting means and a receiving clock generating circuit of the reflected wave receiving means are constituted by separate oscillation circuits.

3. The object sensor according to claim 1, comprising processing means for setting a prohibition mode in which the detection output of the judging circuit part is invalidated when the frequency of short-time switching of the detection output of the judging circuit part reaches a predetermined degree.

4. The object sensor according to claim 3, wherein the processing means cancels the prohibition mode when it is determined that the short-time switching of the detection output of the judging circuit part is stopped after the prohibition mode is set, or when a predetermined time passed after the prohibition mode is set.

5. The object sensor according to claim 1, wherein the specific object is someone's hand, and the specific speed range is a moving speed range of the hand.

6. The object sensor according to claim 5, mounted on a vehicle for detecting a hand of a user approaching a handle of an opening and closing part of the vehicle as the specific object.

7. The object sensor according to claim 6, wherein a transmission antenna constituting the detecting wave transmitting means and a receiving antenna constituting the reflected wave receiving means are provided in the handle, on the surface of the handle, in the opening and closing part or on the surface of the opening and closing part.

8. The object sensor according to claim 6, wherein between the transmission antenna constituting the detecting wave transmitting means and the receiving antenna constituting the reflected wave receiving mans, one is provided in the handle or on the surface thereof and the other is provided in the opening and closing part or on the surface thereof.

9. The object sensor according to claim 6, wherein a detection area is arranged on the inner side of an outer face of the handle.

10. The object sensor according to claim 6, wherein the detection area extends from the back side of the handle to the side of the hand of the user is inserted to that the hand of the user approaching the handle to operate the handle is detected by the object sensor before it is inserted to the back side of the handle.

11. The object sensor according to claim 6, mounted on a building for detecting a hand of a user approaching a handle of an opening and closing part of the building as the specific object.

12. The object sensor according to claim 11, wherein a transmission antenna constituting the detecting wave transmitting means and a receiving antenna constituting the reflected wave receiving means are provided in the handle, on the surface of the handle, in the opening and closing part or on the surface of the opening and closing part.

13. The object sensor according to claim 11, wherein between the transmission antenna constituting the detecting wave transmitting means and the receiving antenna constituting the reflected wave receiving means, one is provided in the handle or on the surface thereof and the other is provided in the opening and closing part or on the surface thereof.

14. The object sensor according to claim 11, wherein a detection area is arranged on the inner side of an outer face of the handle.

15. The object sensor according to claim 11, wherein the detection area extends from the back side of the handle to the side of the hand of the user is inserted so that the handle of the user approaching the handle to operate the handle is detected by the object sensor before it is inserted to the back side of the handle.

16. A controller for controlling a locked state of an opening and closing part of a vehicle, comprising:
an object sensor according to claim 6 and
a body machine mounted on a vehicle for wirelessly transmitting a predetermined request signal to a portable machine of a user when a detection output of the object sensor is turned on, receiving a portable machine answer signal corresponding to the request signal from the portable machine, and carrying out an operation to unlock the opening and closing part of the vehicle in the locked state after it is confirmed that the received portable machine answer signal is appropriate,
wherein the body machine has a body machine transmission antenna for wirelessly transmitting the request signal and a body machine receiving antenna for receiving the portable machine answer signal.

17. The controller according to claim 16, wherein the body machine transmission antenna and a transmission antenna constituting the detecting wave transmitting means and/or the body machine receiving antenna and a receiving antenna constituting the reflected wave receiving means are constituted by a common antenna.

18. The controller according to claim 16, wherein the body machine transmission antenna and/or the body machine receiving antenna are provided in the handle, on the surface of the handle, in the opening and closing part, or on the surface of the opening and closing part.

19. A controller for controlling a locked state of an opening and closing part of a building, comprising:
an object sensor according to claim 11; and
a body machine mounted on the building for wirelessly transmitting a predetermined request signal to a portable machine of a user when a detection output of the object sensor is turned on, receiving a portable machine answer signal corresponding to the request signal from the portable machine, and carrying out an operation to unlock the opening and closing part of the building in the locked state after it is confirmed that the received portable machine answer signal is appropriate,
wherein the body machine has a body machine transmission antenna for wirelessly transmitting the request signal and a body machine receiving antenna for receiving the portable machine answer signal.

20. The controller according to claim 19, wherein the body machine transmission antenna and a transmission antenna constituting the detecting wave transmitting means and/or the body machine receiving antenna and a receiving antenna constituting the reflected wave receiving means are constituted by a common antenna.

21. The controller according to claim 19, wherein the body machine transmission antenna and/or the body machine receiving antenna are provided in the handle, on the surface of the handle, in the opening and closing part, or on the surface of the opening and closing part.

22. A controller for controlling a locked state of an opening and closing part of a vehicle and monitoring air pressure of a tire provided in the vehicle, comprising:
an object sensor according to claim 6;
a pneumatic unit provided in the tire for wirelessly transmitting a pneumatic unit answer signal including pneumatic measurement data of the tire subject to receiving a predetermined request signal; and
a body machine mounted on a vehicle for wirelessly transmitting a predetermined request signal to a portable machine of a user when a detection output of the object sensor is turned on, receiving a portable machine answer signal corresponding to the request signal from the portable machine, carrying out an operation to unlock the opening and closing part of the vehicle in the locked state after it is confirmed that the received portable machine answer signal is appropriate, receiving the pneumatic unit answer signal, and outputting a warning of tire pneumatic malfunction when the pneumatic measurement data included in the received a pneumatic unit answer signal is out of a predetermined appropriate range,
wherein the body machine has a body machine transmission antenna for wirelessly transmitting the request signal and a body machine receiving antenna for receiving the portable machine answer signal or the pneumatic unit answer signal.

23. The controller according to claim 22, wherein a body machine transmission antenna and a transmission antenna constituting the detecting wave transmitting means and/or the body machine receiving antenna and a receiving antenna constituting the reflected wave receiving means are constituted by a common antenna.

24. The controller according to claim 22, wherein the body machine transmission antenna and/or the body machine receiving antenna are provided in the handle, on the surface of the handle, in the opening and closing part, or on the surface of the opening and closing part.

* * * * *